United States Patent
Inoshita

(10) Patent No.: US 10,730,506 B2
(45) Date of Patent: Aug. 4, 2020

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventor: Yuka Inoshita, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 277 days.

(21) Appl. No.: 15/954,861

(22) Filed: Apr. 17, 2018

(65) Prior Publication Data

US 2019/0315335 A1    Oct. 17, 2019

(30) Foreign Application Priority Data

Apr. 25, 2017 (JP) ................... 2017-086155

(51) Int. Cl.

| B60K 6/26 | (2007.10) |
|---|---|
| B60K 6/365 | (2007.10) |
| B60K 6/44 | (2007.10) |
| B60W 20/14 | (2016.01) |
| B60W 10/08 | (2006.01) |
| B60W 10/06 | (2006.01) |

(Continued)

(52) U.S. Cl.
CPC ............ *B60W 20/14* (2016.01); *B60K 6/26* (2013.01); *B60K 6/365* (2013.01); *B60K 6/44* (2013.01); *B60W 10/06* (2013.01); *B60W 10/08* (2013.01); *H02P 5/753* (2013.01); *B60W 2420/00* (2013.01); *B60W 2710/0644* (2013.01); *B60W 2710/083* (2013.01); *H02M 7/5387* (2013.01); *Y10S 903/906* (2013.01); *Y10S 903/91* (2013.01); *Y10S 903/93* (2013.01)

(58) Field of Classification Search
CPC ............ B60K 6/26; B60K 6/365; B60K 6/44; B60W 10/08; B60W 10/06; B60W 20/14; B60W 2420/00; B60W 2710/083; B60W 2710/0644; H02P 5/753; Y10S 903/906; Y10S 903/91; Y10S 903/93; H02M 7/5387

See application file for complete search history.

(56) References Cited

U.S. PATENT DOCUMENTS

| 2005/0269983 A1* | 12/2005 | Takai ..................... B60L 50/61 318/432 |
| 2007/0249461 A1* | 10/2007 | Tsuji ....................... B60K 1/02 477/3 |
| 2017/0088127 A1* | 3/2017 | Matsumura ............ B60L 50/16 |

(Continued)

FOREIGN PATENT DOCUMENTS

JP      2013-203116 A    10/2013

*Primary Examiner* — Stephen Holwerda
(74) *Attorney, Agent, or Firm* — Sughrue Mion, PLLC

(57) ABSTRACT

There is provided a hybrid vehicle including an electronic control unit configured to turn on a second inverter in three phases when an accelerator operation amount is equal to or greater than a predetermined operation amount during predetermined traveling in which the hybrid vehicle is traveling with the engine operated in a state in which a first inverter and a second inverter are shut down and when a rotation speed of a first motor is equal to or less than a predetermined rotation speed. Accordingly, it is possible to rapidly increase a rotation speed of the first motor to be higher than a predetermined rotation speed.

6 Claims, 5 Drawing Sheets

(51) Int. Cl.
*H02P 5/753* (2006.01)
*H02M 7/5387* (2007.01)

(56) References Cited

U.S. PATENT DOCUMENTS

2018/0304881 A1* 10/2018 Okabe .................. B60W 20/15
2018/0312160 A1* 11/2018 Obitsu ............ B60W 30/18027

* cited by examiner

HYBRID VEHICLE AND CONTROL METHOD THEREFOR

CROSS-REFERENCE TO RELATED APPLICATIONS

This application claims priority to Japanese Patent Application No. 2017-086155 filed on Apr. 25, 2017, which is incorporated herein by reference in its entirety.

BACKGROUND

1. Technical Field

The disclosure relates to a hybrid vehicle and a control method therefor.

2. Description of Related Art

As a type of hybrid vehicle in the related art, a hybrid vehicle including an engine, a first motor, a planetary gear set in which the engine, the first motor, and an output member connected to drive wheels are connected to a carrier, a sun gear, and a ring gear thereof, a second motor that is connected to the output member, a first inverter that drives the first motor, a second inverter that drives the second motor, and a power storage device (a battery) that is connected to the first and second inverters via power lines has been proposed (for example, see Japanese Unexamined Patent Application Publication No. 2013-203116 (JP 2013-203116 A)). In this hybrid vehicle, when the hybrid vehicle is traveling with the engine operated in a state in which the first inverter and the second inverter are shut down, the engine is controlled such that a counter electromotive voltage which is generated with rotation of the first motor becomes higher than a DC-side voltage of the first inverter based on DC-side voltages of the first inverter and the second inverter, a rotation speed of the output member, and an accelerator operation amount. Through this control, a braking torque based on the counter electromotive voltage of the first motor is adjusted and a reaction torque (a driving torque generated in the output member) of the braking torque is adjusted.

SUMMARY

In the hybrid vehicle, when the hybrid vehicle is traveling with the engine operated in a state in which the first inverter and the second inverter are shut down and the accelerator operation amount is sufficiently small (for example, when an accelerator is turned off), a rotation speed of the engine is decreased such that a rotation speed of the first motor becomes equal to or less than a predetermined rotation speed (a rotation speed at which the counter electromotive voltage of the first motor is equal to or less than the DC-side voltage of the first inverter) and output of the reaction torque (the driving torque) to the output member is stopped. Then, when the accelerator operation amount increases (for example, when the accelerator is turned on), the rotation speed of the engine is increased such that the rotation speed of the first motor becomes equal to or greater than the predetermined rotation speed, and the reaction torque (the driving torque) is output to the output member. However, since the engine has low control responsiveness, the rotation speed of the first motor cannot be rapidly increased to be equal to or greater than the predetermined rotation speed and the reaction torque (the driving torque) cannot be rapidly output to the output member.

In consideration of the above-mentioned circumstances, the disclosure provides a hybrid vehicle and a control method therefor that perform control such that a rotation speed of a first motor is rapidly increased to be equal to or greater than a predetermined rotation speed when an accelerator operation amount is equal to or greater than a predetermined operation amount during predetermined traveling in which the hybrid vehicle is traveling with an engine operated in a state in which a first inverter and a second inverter are shut down and the rotation speed of the first motor is equal to or less than a predetermined rotation speed at which a counter electromotive voltage of the first motor is equal to or less than a DC-side voltage of the first inverter.

According to an aspect of the disclosure, there is provided a hybrid vehicle including an engine, a first motor, a second motor, a planetary gear set, a first inverter, a second inverter, a power storage device, and an electronic control unit. The first motor is configured to generate a counter electromotive voltage with rotation thereof. The second motor is configured to input and output power to and from a drive shaft of the hybrid vehicle. In the planetary gear set, three rotary elements are connected to three shafts of the first motor, the engine, and the drive shaft connected to an axle of the hybrid vehicle such that the first motor, the engine, and the drive shaft are sequentially arranged in a nomogram. The first inverter is configured to drive the first motor. The second inverter is configured to drive the second motor. The power storage device is connected to the first inverter and the second inverter via power lines. The electronic control unit is configured (i) to control the engine, the first inverter, and the second inverter, and (ii) to turn on the second inverter in three phases when an accelerator operation amount is equal to or greater than a predetermined operation amount during predetermined traveling in which the hybrid vehicle is traveling with the engine operated in a state in which the first inverter and the second inverter are shut down and when a rotation speed of the first motor is equal to or less than a predetermined rotation speed.

According to another aspect of the disclosure, there is provided a control method for a hybrid vehicle including an engine, a first motor, a second motor, a planetary gear set, a first inverter, and a second inverter. There, the first motor is configured to generate a counter electromotive voltage with rotation of the first motor. The second motor is configured to input and output power to and from a drive shaft connected to an axle of the hybrid vehicle. In the planetary gear set, three rotary elements are connected to three shafts of the first motor, the engine, and the drive shaft such that the first motor, the engine, and the drive shaft are sequentially arranged in a nomogram. The first inverter is configured to drive the first motor. The second inverter is configured to drive the second motor. The control method includes: (i) controlling the engine, the first inverter, and the second inverter; and (ii) turning on the second inverter in three phases when an accelerator operation amount is equal to or greater than a predetermined operation amount during predetermined traveling in which the hybrid vehicle is traveling with the engine operated in a state in which the first inverter and the second inverter are shut down and when a rotation speed of the first motor is equal to or less than a predetermined rotation speed.

In the hybrid vehicle according to the disclosure and the control method therefor, when the accelerator operation amount is equal to or greater than a predetermined operation amount during predetermined traveling in which the hybrid vehicle is traveling with the engine operated in a state in which the first inverter and the second inverter are shut down and when the rotation speed of the first motor is equal to or less than a predetermined rotation speed, the second inverter is turned on in three phases. Here, the predetermined operation amount may be a threshold value that is used to determine whether a driving force of the hybrid vehicle is requested. The predetermined rotation speed may be a threshold value that is used to determine whether a regenerative torque based on a counter electromotive voltage is generated in the first motor. The electronic control unit may be configured to turn on the second inverter in three phases by turning on all arm transistors in any one of the upper-arm transistors and lower-arm transistors in the second inverter. When the second inverter is turned on in three phases, a torque (a drag torque) in a direction in which the rotation speed of the second motor decreases is generated. Since this torque is output to a rotary shaft of the first motor as a torque in a direction in which the rotation speed of the first motor increases via the planetary gear set, it is possible to more rapidly increase the rotation speed of the first motor to be higher than a predetermined rotation speed.

In the hybrid vehicle according to the disclosure, the electronic control unit may cause the hybrid vehicle to travel by the predetermined traveling by shutting down the second inverter when the second inverter is turned on in three phases based on that the accelerator operation amount is equal to or greater than the predetermined operation amount in the predetermined traveling and the rotation speed of the first motor is equal to or less than the predetermined rotation speed and when the rotation speed of the first motor becomes equal to or greater than the predetermined rotation speed. With this hybrid vehicle, when the rotation speed of the first motor is equal to or greater than the predetermined rotation speed, a regenerative torque based on the counter electromotive voltage can be generated using the first motor. Accordingly, when the rotation speed of the first motor is equal to or greater than the predetermined rotation speed, the hybrid vehicle can travel with the driving torque of the drive shaft based on the regenerative torque of the first motor by the predetermined traveling in which the second inverter is shut down.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
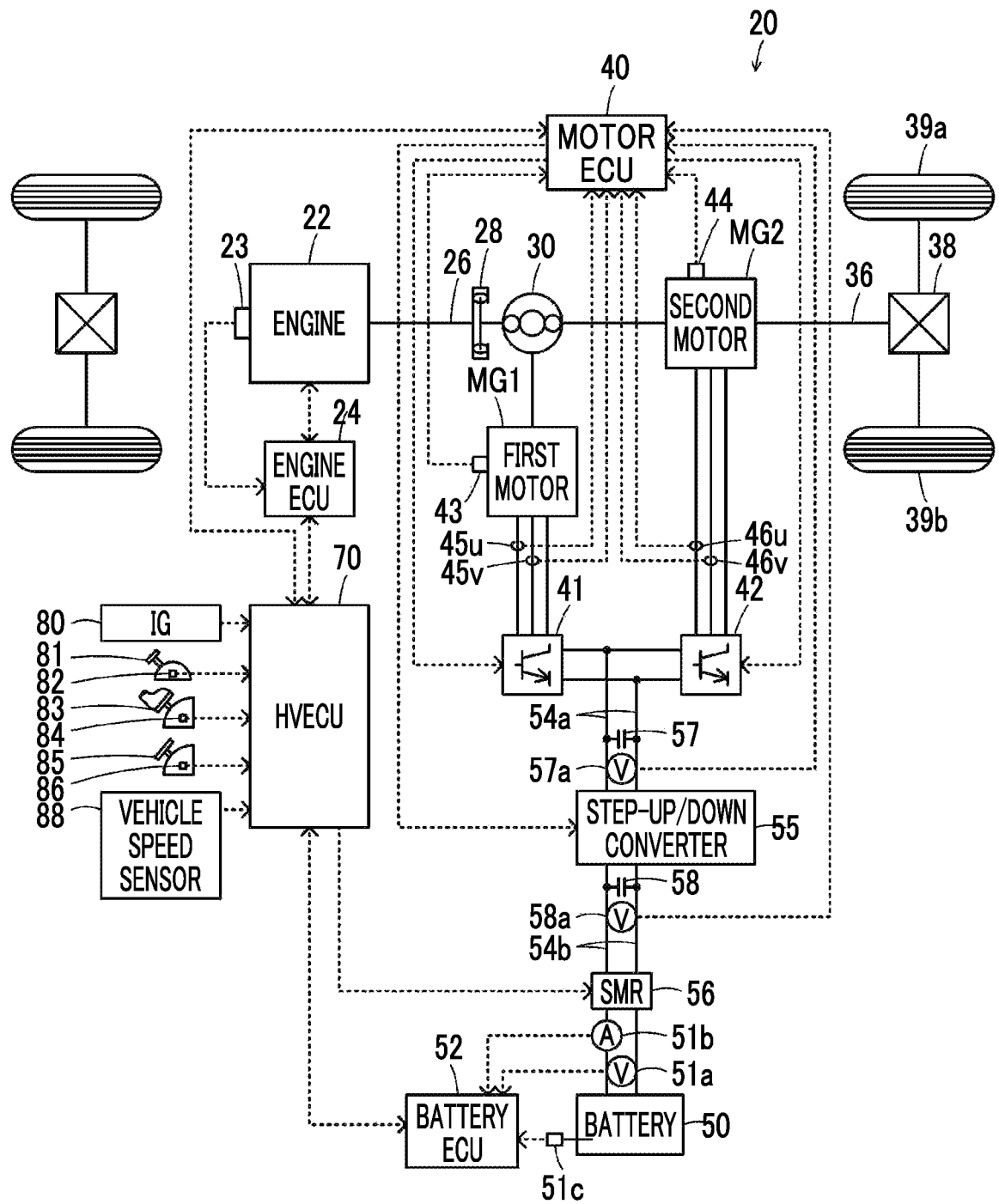
FIG. 1 is a diagram schematically illustrating a configuration of a hybrid vehicle according to an embodiment of the disclosure.
Figure 2:
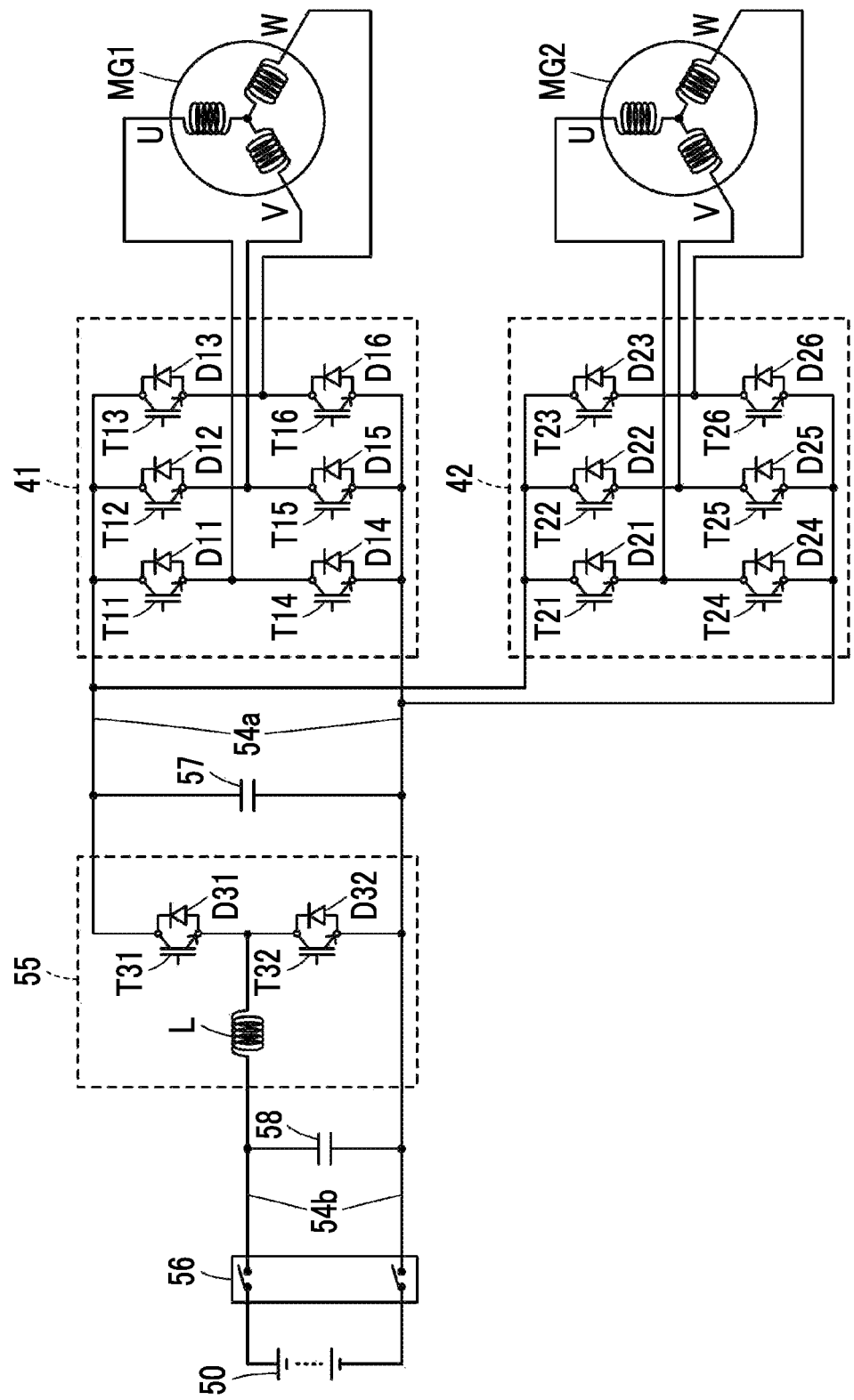
FIG. 2 is a diagram schematically illustrating a configuration of an electric machine driving system including a first motor and a second motor.

FIG. 1 is a diagram schematically illustrating a configuration of a hybrid vehicle 20 according to an embodiment of the disclosure. FIG. 2 is a diagram schematically illustrating a configuration of an electric machine driving system including a first motor MG1 and a second motor MG2. As illustrated in the drawings, the hybrid vehicle 20 according to the embodiment includes an engine 22, a planetary gear set 30, a first motor MG1, a second motor MG2, a first inverter 41, a second inverter 42, a step-up/down converter 55, a battery 50 as a power storage device, a system main relay 56, and a hybrid electronic control unit (hereinafter referred to as an "HVECU") 70.

The engine 22 is configured as an internal combustion engine that outputs power using gasoline or diesel as fuel. Operation of the engine 22 is controlled by an engine electronic control unit (hereinafter referred to as an "engine ECU") 24.

Although not illustrated in the drawings, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22, for example, a crank angle θcr from a crank position sensor 23 that detects a rotational position of a crank shaft 26 of the engine 22, are input to the engine ECU 24 via the input port. Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle θcr from the crank position sensor 23.

The planetary gear set 30 is configured as a single pinion type planetary gear set mechanism. A rotor of the first motor MG1 is connected to a sun gear of the planetary gear set 30. A drive shaft 36 connected to driving wheels 39a and 39b via a differential gear 38 is connected to a ring gear of the planetary gear set 30. The crank shaft 26 of the engine 22 is connected to a carrier of the planetary gear set 30 via a damper 28.

The first motor MG1 is configured as a synchronous generator motor including a rotor that has a permanent magnet embedded therein and a stator on which three-phase coils are wound, and the rotor thereof is connected to the sun gear of the planetary gear set 30 as described above. The second motor MG2 is configured as a synchronous generator motor similarly to the first motor MG1 and a rotor thereof is connected to the drive shaft 36.

The first inverter 41 and the second inverter 42 are used to drive the first motor MG1 and the second motor MG2. As illustrated in FIG. 2, the first inverter 41 is connected to power lines 54a on a high voltage side and includes six transistors T11 to T16 and six diodes D11 to D16 that are connected in parallel to the six transistors T11 to T16. The transistors T11 to T16 are arranged as pairs of two transistors to serve as a source side and a sink side with respect to a positive electrode line and a negative electrode line of the power lines 54a on the high voltage side. Each junction between transistors constituting a pair in the transistors T11 to T16 is connected to the corresponding three-phase coil (a U phase, a V phase, or a W phase) of the first motor MG1. Accordingly, when a voltage is applied to the first inverter 41, an ON-time ratio of the transistors T11 to T16 constituting each pair is adjusted by a motor electronic control unit (hereinafter referred to as a "motor ECU") 40, whereby a rotating magnetic field is formed in the three-phase coils and the first motor MG1 is rotationally driven. Similarly to the first inverter 41, the second inverter 42 is connected to the power lines 54a on the high voltage side and includes six transistors T21 to T26 and six diodes D21 to D26. When a voltage is applied to the second inverter 42, an ON-time ratio of the transistors T21 to T26 constituting each pair is adjusted by the motor ECU 40, whereby a rotating magnetic field is formed in the three-phase coils and the second motor MG2 is rotationally driven.

The step-up/down converter 55 is connected to the power lines 54a on the high voltage side and power lines 54b on a low voltage side and includes two transistors T31 and T32, two diodes D31 and D32 that are connected in parallel to the two transistors T31 and T32, and a reactor L. The transistor T31 is connected to the positive electrode line of the power lines 54a on the high voltage side. The transistor T32 is connected to the transistor T31 and the negative electrode lines of the power lines 54a on the high voltage side and the power lines 54b on the low voltage side. The reactor L is connected to a junction point between the transistors T31 and T32 and the positive electrode line of the power lines 54b on the low voltage side. When an ON-time ratio of the transistors T31 and T32 is adjusted by the motor ECU 40, the step-up/down converter 55 steps up power of the power lines 54b on the low voltage side and supplies the stepped-up power to the power lines 54a on the high voltage side or steps down power of the power lines 54a on the high voltage side and supplies the stepped-down power to the power lines 54b on the low voltage side. A smoothing capacitor 57 is attached to the positive electrode line and the negative electrode line of the power lines 54a on the high voltage side, and a smoothing capacitor 58 is attached to the positive electrode line and the negative electrode line of the power lines 54b on the low voltage side.

Although not illustrated in the drawings, the motor ECU 40 is configured as a microprocessor such as a CPU, and includes a ROM that stores a processing program, a RAM that temporarily stores data, input and output ports, and a communication port in addition to the CPU. As illustrated in FIG. 1, signals from various sensors which are required for controlling operation of the first motor MG1, the second motor MG2, and the step-up/down converter 55 are input to the motor ECU 40 via the input port. Examples of the signals input to the motor ECU 40 include a first rotational position $\theta m1$ and a second rotational position $\theta m2$ from a first rotational position sensor 43 and a second rotational position sensor 44 that detect rotational positions of the rotors of the first motor MG1 and the second motor MG2 and phase currents Iu1, Iv1, Iu2, and Iv2 from current sensors 45u, 45v, 46u, and 46v that detect currents flowing in phases of the first motor MG1 and the second motor MG2. Examples thereof further include a voltage (a voltage on a high voltage side) VH of the capacitor 57 (the power lines 54a on the high voltage side) from a voltage sensor 57a that is attached between the terminals of the capacitor 57 and a voltage (a voltage on a low voltage side) VL of the capacitor 58 (the power lines 54b on the low voltage side) from a voltage sensor 58a that is attached between the terminals of the capacitor 58. Various control signals for controlling operation of the first motor MG1, the second motor MG2, and the step-up/down converter 55 are output from the motor ECU 40 via the output port. Examples of the signals output from the motor ECU 40 include switching control signals for the transistors T11 to T16 and T21 to T26 of the first inverter 41 and the second inverter 42 and switching control signals for the transistors T31 and T32 of the step-up/down converter 55. The motor ECU 40 is connected to the HVECU 70 via the communication port. The motor ECU 40 calculates angular velocities com1 and ωm2 or rotation speeds Nm1 and Nm2 of the first motor MG1 and the second motor MG2 based on the first rotational position $\theta m1$ and the second rotational position $\theta m2$ of the rotors of the first motor MG1 and the second motor MG2 from the first rotational position sensor 43 and the second rotational position sensor 44.

The battery 50 is configured as a lithium-ion secondary battery or a nickel-hydride secondary battery with a rated voltage of, for example, 250 V, 280 V, or 300 V, and is connected to the power lines 54b on the low voltage side. The battery 50 is controlled by a battery electronic control unit (hereinafter referred to as a "battery ECU") 52.

Although not illustrated in the drawings, the battery ECU 52 is configured as a microprocessor such as a CPU, and includes a ROM that stores a processing program, a RAM that temporarily stores data, input and output ports, and a communication port in addition to the CPU. Signals from various sensors which are required for controlling the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. The state of charge SOC refers to a ratio of capacity of electric power which can be discharged from the battery 50 to the total capacity of the battery 50.

The system main relay 56 is disposed closer to the battery 50 than the capacitor 58 in the power lines 54b on the low voltage side. When ON and OFF thereof is controlled by the HVECU 70, the system main relay 56 connects or disconnects the battery 50 and the step-up/down converter 55.

Although not illustrated in the drawings, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples of the shift position SP include a parking position (a P position), a reverse position (an R position), a neutral position (an N position), and a drive position (a D position). As described above, the HVECU 70 is connected to the engine ECU 24, the motor ECU 40, and the battery ECU 52 via the communication port.

The hybrid vehicle 20 having the above-mentioned configuration travels in a hybrid traveling (HV traveling) mode in which the vehicle travels with the engine 22 operating and in an electric traveling (EV traveling) mode in which the vehicle travels with the engine 22 not operated.

In the HV traveling mode, the HVECU 70 sets a required torque Td* required for the drive shaft 36 based on the accelerator operation amount Acc and the vehicle speed V and calculates a required power Pd* required for the drive shaft 36 by multiplying the set required torque Td* by the rotation speed Nd of the drive shaft 36 (that rotation speed Nm2 of the second motor MG2). Subsequently, the HVECU 70 sets a required power Pe* required for the engine 22 by subtracting a required charging/discharging power Pb* (which has a positive value when electric power is discharged from the battery 50) based on the state of charge SOC of the battery 50 from the required power Pd*. Then, the HVECU 70 sets a target rotation speed Ne* or a target torque Te* of the engine 22 and torque commands Tm1* and Tm2* of the first motor MG1 and the second motor MG2 such that the required power Pe* is output from the engine 22 and the required torque Td* is output to the drive shaft 36. Subsequently, the HVECU 70 sets a target voltage VH* of the power lines 54a on the high voltage side based on the torque commands Tm1* and Tm2* or the rotation speeds Nm1 and Nm2 of the first motor MG1 and the second motor MG2. Then, the HVECU 70 transmits the target rotation speed Ne* or the target torque Te* of the engine 22 to the engine ECU 24 or transmits the torque commands Tm1* and Tm2* of the first motor MG1 and the second motor MG2 or the target voltage VH* of the power lines 54a on the high voltage side to the motor ECU 40. The engine ECU 24 performs intake air control, fuel injection control, ignition control, and the like of the engine 22 such that the engine 22 operates based on the target rotation speed Ne* and the target torque Te*. The motor ECU 40 performs switching control of the transistors T11 to T16 and T21 to T26 of the first inverter 41 and the second inverter 42 such that the first motor MG1 and the second motor MG2 operate with the torque commands Tm1* and Tm2*, and performs switching control of the transistors T31 and T32 of the step-up/down converter 55 such that the voltage VH of the power lines 54a on the high voltage side reaches the target voltage VH*.

In the EV traveling mode, the HVECU 70 sets the required torque Td* based on the accelerator operation amount Acc and the vehicle speed V, sets the torque command Tm1* of the first motor MG1 to a value of 0, sets the torque command Tm2* of the second motor MG2 such that the required torque Td* is output to the drive shaft 36, and sets the target voltage VH* of the power lines 54a on the high voltage side based on the torque commands Tm1* and Tm2* or the rotation speeds Nm1 and Nm2 of the first motor MG1 and the second motor MG2. The HVECU 70 transmits the torque commands Tm1* and Tm2* of the first motor MG1 and the second motor MG2 or the target voltage VH* of the power lines 54a on the high voltage side to the motor ECU 40. Control of the first inverter 41 and the second inverter 42 or the step-up/down converter 55 by the motor ECU 40 is the same as described above.

Figure 3:
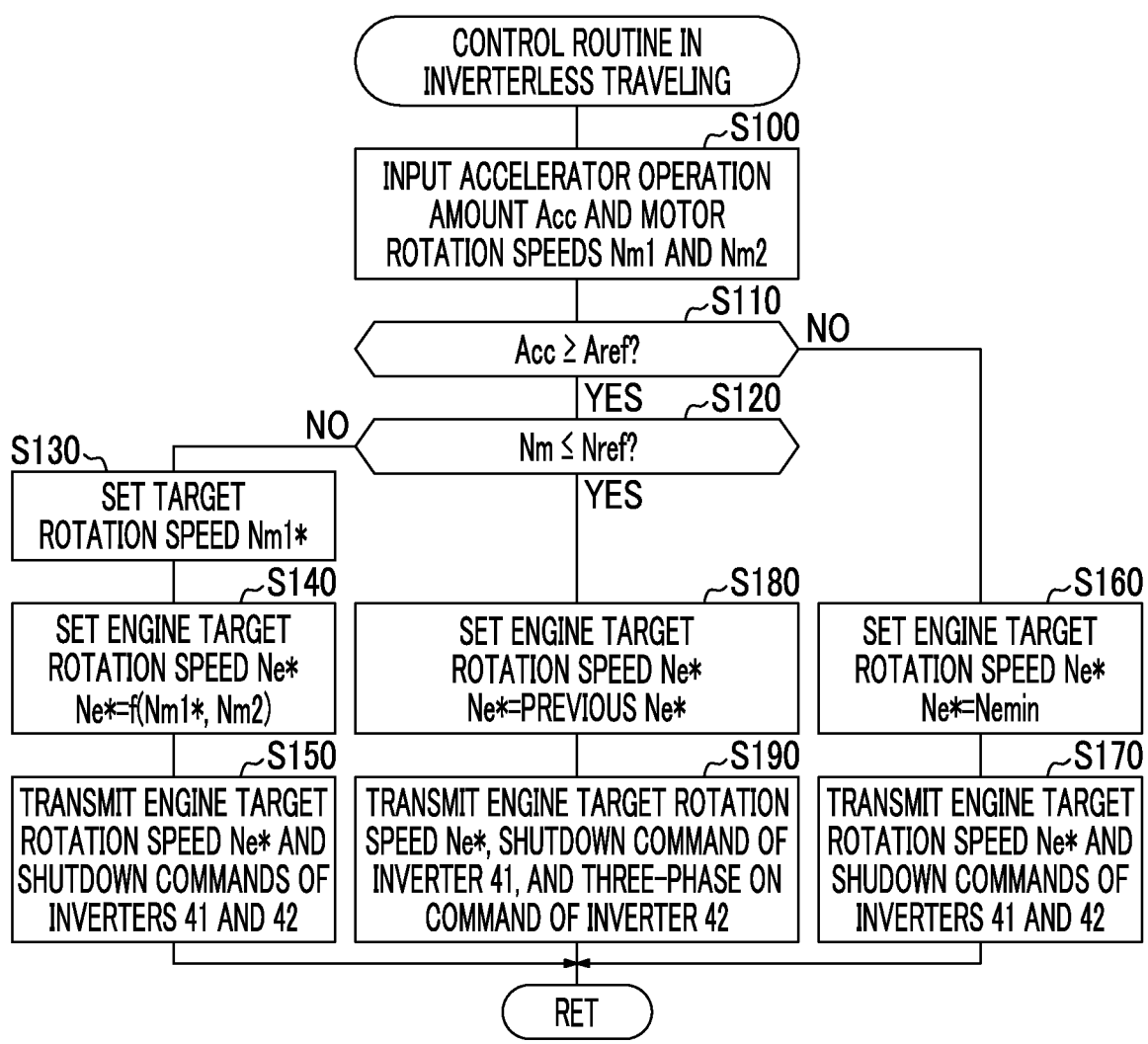
FIG. 3 is a flowchart illustrating an example of a control routine in inverterless traveling which is performed by a hybrid electronic control unit illustrated in FIG. 1.

Operations of the hybrid vehicle 20 according to the embodiment having the above-mentioned configuration, particularly, operations in inverterless traveling (traveling in a limp home mode) in which the hybrid vehicle travels with the engine 22 operating in a state in which the first inverter 41 and the second inverter 42 are shut down (a state in which all of the transistors T11 to T16 and T21 to T26 are turned off), will be described below. Here, the inverterless traveling is performed when an abnormality occurs in the first inverter 41 or the second inverter 42 or an abnormality occurs in the sensors (such as the first rotational position sensor 43 and the second rotational position sensor 44) which is used for control of the first inverter 41 and the second inverter 42 during traveling in the HV traveling mode. FIG. 3 is a flowchart illustrating an example of a control routine in inverterless traveling which is performed by the HVECU 70 in the embodiment. This control routine is repeatedly performed during the inverterless traveling. During the inverterless traveling, in the step-up/down converter 55, the target voltage VH* of the power lines 54a on the high voltage side is set to a predetermined voltage VHset (for example, 330 V, 350 V, or 370 V) and switching control of the transistors T31 and T32 is performed such that the voltage VH of the power lines 54a on the high voltage side reaches the target voltage VH*.

When this routine is performed, the HVECU 70 receives an accelerator operation amount Acc or a rotation speeds Nm1 and Nm2 of the first motor MG1 and the second motor MG2 (Step S100). Here, a value detected by the accelerator pedal position sensor 84 is input as the accelerator operation amount Acc. As the rotation speeds Nm1 and Nm2 of the first motor MG1 and the second motor MG2, values calculated based on the first rotational position θm1 and the second rotational position θm2 of the rotors of the first motor MG1 and the second motor MG2 which are detected by the first rotational position sensor 43 and the second rotational position sensor 44 are input from the motor ECU 40 by communication or values calculated based on the vehicle speed V or the like detected by the vehicle speed sensor 88.

When data is input in this way, the input accelerator operation amount Acc is compared with a threshold value Aref (Step S110), and the rotation speed Nm1 of the first motor MG1 is compared with a threshold value Nref (Step S120). Here, the threshold value Aref is a threshold value that is used to determine whether a driver requests to output a driving torque to the drive shaft 36 (whether a driving force request has been issued by a driver) and, for example, 1%, 3%, or 4% can be used. The threshold value Nref is a threshold value that is used to determine whether a regenerative torque Tcef based on a counter electromotive voltage Vcef due to rotation of the first motor MG1 is generated. The threshold value Nref will be described below.

Figure 4:
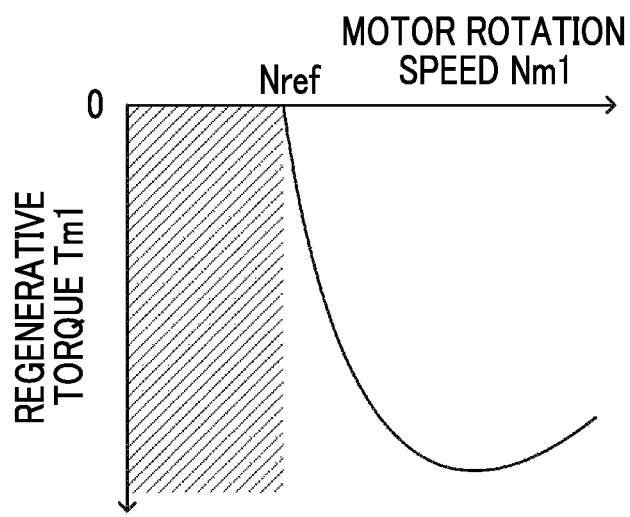
FIG. 4 is a diagram illustrating a relationship between a rotation speed of the first motor and a regenerative torque of the first motor when a voltage of power lines on a high voltage side illustrated in FIG. 1 is a predetermined voltage.

FIG. 4 is a diagram illustrating a relationship between the rotation speed Nm1 of the first motor MG1 when the voltage VH of the power lines 54a on the high voltage side is a predetermined voltage VHset and the regenerative torque Tcef based on the counter electromotive voltage Vcef due to rotation of the first motor MG1. In the drawing, an area in which the regenerative torque Tcef is not generated in the first motor MG1 is hatched. When the counter electromotive voltage Vcef of the first motor MG1 is higher than the voltage VH of the power lines 54a on the high voltage side, a regenerative torque Tcef based on a voltage difference (Vcef−VH) between the counter electromotive voltage Vcef of the first motor MG1 and the voltage VH of the power lines 54a on the high voltage side is generated from the first motor MG1. Specifically, the regenerative torque Tcef is generated by causing the first motor MG1 to rotate by interlocking with rotation of the operation of the engine 22, rectifying electric power based on the counter electromotive voltage Vcef of the first motor MG1 using the diodes D11 to D16 of the first inverter 41, and supplying the rectified electric power to the battery 50 via the power lines 54a on the high voltage side, the step-up/down converter 55, and the power lines 54b on the low voltage side. When the counter electromotive voltage Vcef of the first motor MG1 is equal to or less than the voltage VH of the power lines 54a on the high voltage side, no regenerative torque Tcef is generated in the first motor MG1. Here, the counter electromotive voltage Vcef of the first motor MG1 corresponds to a product of the angular velocity ωm1 of the first motor MG1 and a counter electromotive voltage constant Ke. In consideration of this, a rotation speed at which the counter electromotive voltage Vcef of the first motor MG1 is equal to the voltage VH of the power lines 54a on the high voltage side, for example, 1500 rpm, 1750 rpm, or 2000 rpm, is used as the threshold value Nref in this embodiment. When the voltage VH of the power lines 54a on the high voltage side is not fixed to the predetermined voltage VHset but changes, the threshold value Nref may be changed with the change of the voltage VH.

When it is determined in Step S110 that the accelerator operation amount Acc is equal to or greater than the threshold value Aref and the rotation speed Nm1 of the first motor MG1 is greater than the threshold value Nref, it is determined that there is a driving force request from a driver and a regenerative torque Tcef can be generated from the first motor MG1, and the target rotation speed Nm1* of the first motor MG1 is set to a predetermined rotation speed Nm1set (Step S130). For example, 4000 rpm, 5000 rpm, or 6000 rpm is used as the predetermined rotation speed Nm1set.

Figure 5:
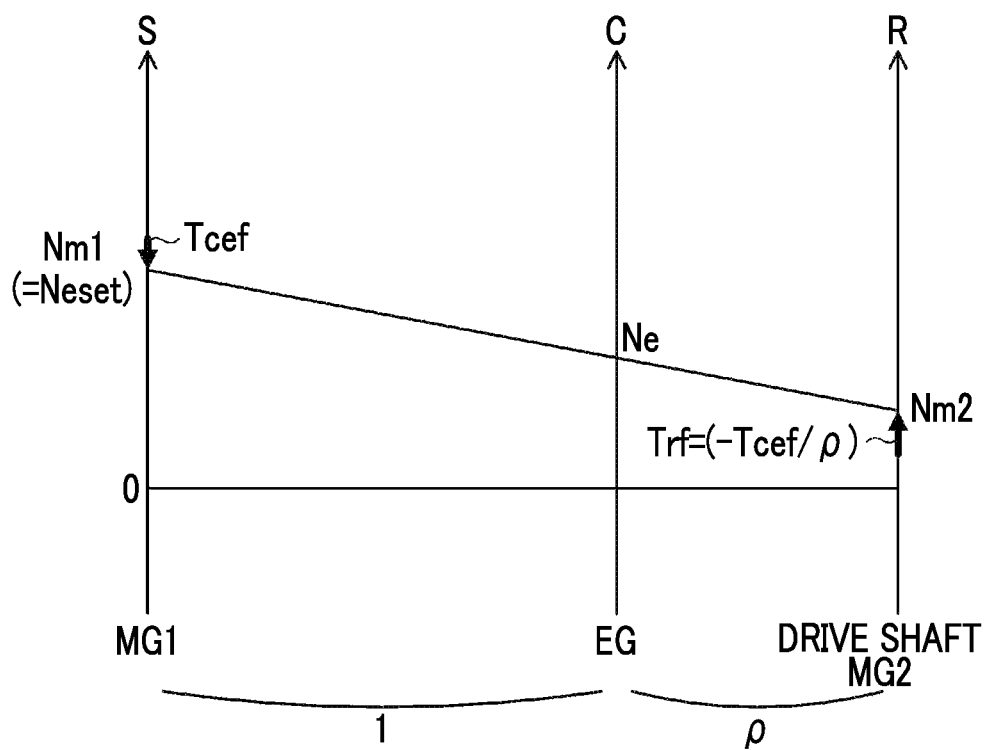
FIG. 5 is a diagram illustrating an example of a nomogram of a planetary gear set when an accelerator operation amount is equal to or greater than a threshold value and the rotation speed of the first motor is greater than a threshold value in a state in which the hybrid vehicle is traveling by inverterless traveling.

FIG. 5 is a diagram illustrating an example of a nomogram of the planetary gear set 30 when the rotation speed Nm1 of the first motor MG1 is greater than the threshold value Nref in inverterless traveling. In the drawing, an S axis on the left side represents a rotation speed of the sun gear of the planetary gear set 30 which is the rotation speed Nm1 of the first motor MG1, a C axis represents a rotation speed of the carrier of the planetary gear set 30 which is the rotation speed Ne of the engine 22, and an R axis represents a rotation speed of the ring gear of the planetary gear set 30 which is the rotation speed Nm2 of the second motor MG2 (and the rotation speed Nd of the drive shaft 36). In the drawing, "ρ" represents a gear ratio (the number of teeth of the sun gear/the number of teeth of the ring gear) of the planetary gear set 30. When the rotation speed Nm1 of the first motor MG1 is greater than the threshold value Nref, the counter electromotive voltage Vcef of the first motor MG1 is greater than the voltage VH of the power lines 54a on the high voltage side, the regenerative torque Tcef based on the voltage difference (Vcef−VH) between the counter electromotive voltage Vcef of the first motor MG1 and the voltage VH of the power lines 54a on the high voltage side is generated in the first motor MG1 as illustrated in the drawing, and a driving torque (a reaction torque) Trf (=−Tcef/ρ) based on the regenerative torque Tcef is output to the drive shaft 36.

When the target rotation speed Nm1* of the first motor MG1 is set in this way, the target rotation speed Ne* of the engine 22 is set by Equation (1) using the target rotation speed Nm1* of the first motor MG1, the rotation speed Nm2* of the second motor MG2 (the rotation speed Nd of the drive shaft 36), and the gear ratio ρ of the planetary gear set 30 (Step S140), the target rotation speed Ne* is transmitted to the engine ECU 24, a shutdown command is transmitted to the motor ECU 40 (Step S150), and then this routine ends. Here, Equation (1) can be easily derived using FIG. 5. When the target rotation speed Ne* of the engine 22 is received, the engine ECU 24 performs intake air control, fuel injection control, and ignition control of the engine 22 such that the rotation speed Ne of the engine 22 reaches the target rotation speed Ne*. When the shutdown command is received, the motor ECU 40 shuts the first inverter 41 and the second inverter 42 down. When the accelerator operation amount Acc is equal to or greater than the threshold value Aref and the rotation speed Nm1 of the first motor MG1 is greater than the threshold value Nref by this control, the hybrid vehicle can travel using the driving torque of the drive shaft 36 based on the regenerative torque Tcef1 of the first motor MG1.

$$Ne^{*}=(Nm1^{*}xp+Nm2)/(1+\rho) \quad (1)$$

Figure 6:
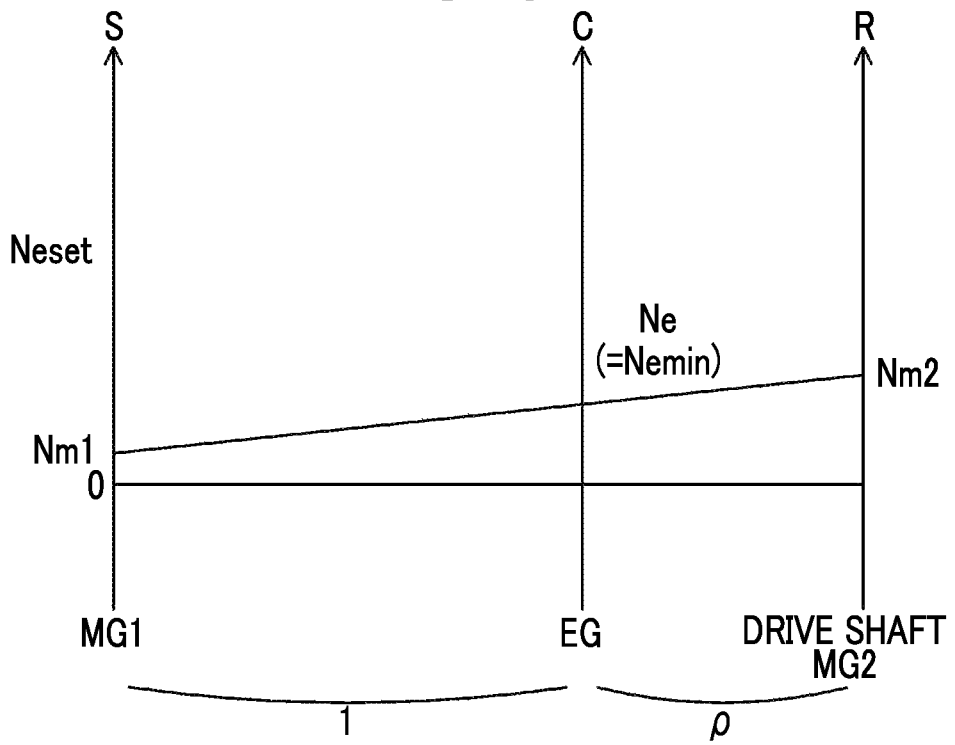
FIG. 6 is a diagram illustrating an example of a nomogram of the planetary gear set when the accelerator operation amount is less than the threshold value in the inverterless traveling.

When it is determined in Step S110 that the accelerator operation amount Acc is less than the threshold value Aref, it is determined that there is no driving force request from the driver, the target rotation speed Ne* of the engine 22 is set to an allowable lower-limit rotation speed Nemin (Step S160), the target rotation speed Ne* is transmitted to the engine ECU 24, a shutdown command is transmitted to the motor ECU 40 (Step S170), and then this routine ends. When the target rotation speed Ne* of the engine 22 is received, the engine ECU 24 controls the engine 22 such that the rotation speed Ne of the engine 22 reaches the target rotation speed Ne*. When the shutdown command is received, the motor ECU 40 shuts the first inverter 41 and the second inverter 42 down. Here, the allowable lower-limit rotation speed Nemin of the engine 22 is a lower limit of a rotation speed range in which the engine 22 can operate autonomously and, for example, 900 rpm, 1000 rpm, or 1100 rpm is used. By causing the engine 22 to rotate at the allowable lower-limit rotation speed Nemin in this way, the rotation speed Nm1 of the first motor MG1 can be set to be sufficiently lower than the rotation speed (the predetermined rotation speed Neset) when the accelerator is turned on. FIG. 6 is a diagram illustrating a nomogram of the planetary gear set 30 when the accelerator operation amount ACC is less than the threshold value Aref in inverterless traveling. When the accelerator operation amount Acc is less than the threshold value Aref, the regenerative torque Tcef1 is not generated in the first motor MG1 as illustrated in the drawing and thus the driving torque Trf is not output to the drive shaft 36.

When it is determined in Step S110 that the accelerator operation amount Acc is equal to or greater than the threshold value Aref and the rotation speed Nm1 of the first motor MG1 is equal to or less than the threshold value Nref, it is determined that there is a driving force request from the driver but the regenerative torque Tcef cannot be generated from the first motor MG1, the target rotation speed Ne* of the engine 22 is set to the target rotation speed Ne* (previous Ne*) set when the routine was previously performed (Step S180), the target rotation speed Ne* of the engine 22 is transmitted to the engine ECU 24, a shutdown command of the first inverter 41 and a three-phase ON command of the second inverter 42 are transmitted to the motor ECU 40 (Step S190), and then this routine ends. When the target rotation speed Ne* of the engine 22 is received, the engine ECU 24 controls the engine 22 such that the rotation speed Ne of the engine 22 reaches the target rotation speed Ne*. When the shutdown command of the first inverter 41 is received, the motor ECU 40 continues to shut the first inverter 41 down. When the three-phase ON command is received, the motor ECU 40 turns on all the transistors of any one of upper-arm transistors (T21 to T23) and lower-arm transistors (T24 to T26) in the second inverter 42.

Figure 7:
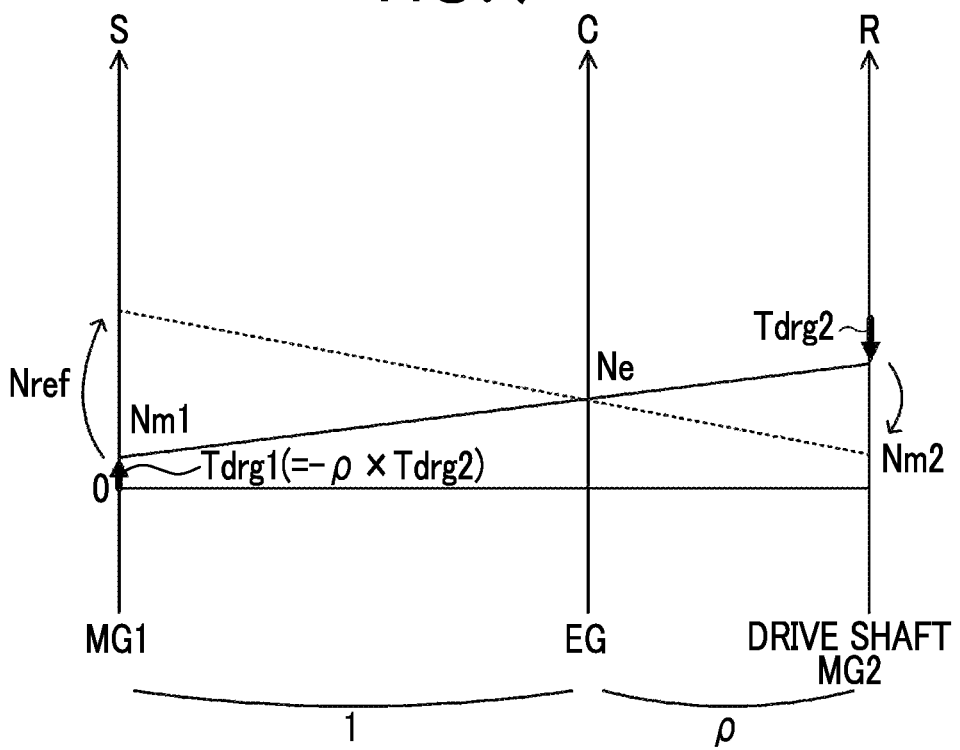
FIG. 7 is a diagram illustrating an example of a nomogram of the planetary gear set when the second inverter illustrated in FIG. 1 is turned on in three phases.

FIG. 7 is a diagram illustrating a nomogram of the planetary gear set 30 when the second inverter 42 is turned on in three phases. In the drawing, a solid line represents an example of the nomogram of the planetary gear set 30 immediately before the second inverter 42 is turned on in three phases. A dotted line represents an example of a nomogram of the planetary gear set 30 when the second inverter 42 is turned on in three phases. When the second inverter 42 is turned on in three phase as illustrated in the drawing, a torque (a drag torque) Tdrg2 in a direction in which the rotation speed Nm2 of the second motor MG2 decreases is output to the rotary shaft of the first motor MG1 via the planetary gear set 30 as a torque Tdrg1 (=−ρ·Tdrg2) for increasing the rotation speed of the first motor MG1. Accordingly, it is possible to increase the rotation speed Nm1 of the first motor MG1. In general, the second motor MG2 has better control responsiveness than the engine 22. Accordingly, when the rotation speed Nm1 of the first motor MG1 is increased by turning on the second inverter 42 in three phases, the rotation speed Nm1 can be increased more rapidly than when the rotation speed Nm1 of the first motor MG1 is increased by increasing the rotation speed Ne of the engine 22.

When the rotation speed Nm1 of the first motor MG1 increases to be greater than the threshold value Nref in this way, the routine transitions to Step S130, the target rotation speed Nm1* of the first motor MG1 and the target rotation speed Ne* of the engine 22 are set (Steps S130 and S140), the target rotation speed Ne* of the engine 22 is transmitted to the engine ECU 24, and the shutdown command is transmitted to the motor ECU 40 (Step S150), and then this routine ends. When the target rotation speed Ne* of the engine 22 is received, the engine ECU 24 controls the engine 22 such that the rotation speed Ne of the engine 22 reaches the target rotation speed Ne*. When the shutdown command is received, the motor ECU 40 shuts the first inverter 41 and the second inverter down. Accordingly, the hybrid vehicle can perform inverterless traveling using the driving torque of the drive shaft 36 based on the regenerative torque Tcef1 of the first motor MG1.

In the hybrid vehicle 20 according to the above-mentioned embodiment, when the accelerator operation amount Acc is equal to or greater than the threshold value Aref in inverterless traveling and the rotation speed Nm1 of the first motor MG1 is equal to or less than the threshold value Nref, it is possible to more rapidly increase the rotation speed Nm1 of the first motor MG1 to be greater than the threshold value Nref by turning on the second inverter 42 in three phases. Thereafter, when the rotation speed Nm1 of the first motor MG1 becomes equal to or greater than the threshold value Nref, the second inverter 42 is shut down and thus the hybrid vehicle can perform inverterless traveling.

In the hybrid vehicle 20 according to the embodiment, the previous target rotation speed Ne* is set as the target rotation speed Ne* of the engine 22 and the second inverter 42 is turned on in three phases while maintaining the rotation speed Ne of the engine 22 in Steps S180 and S190, but the second inverter 42 may be turned on in three phases while increasing the rotation speed Ne of the engine 22.

The hybrid vehicle 20 according to the embodiment includes the step-up/down converter 55, but may not include the step-up/down converter 55.

In the hybrid vehicle 20 according to the embodiment, the battery 50 is used as a power storage device, but any device may be used as long as it is a device that is chargeable such as a capacitor.

The hybrid vehicle 20 according to the embodiment includes the engine ECU 24, the motor ECU 40, the battery ECU 52, and the HVECU 70, but at least two thereof may be configured as a single electronic control unit.

Correspondence between principal elements in the embodiment and principal elements of the disclosure described in the SUMMARY will be described below. In the embodiment, the engine 22 is an example of the "engine." The first motor MG1 is an example of the "first motor." The planetary gear set 30 is an example of the "planetary gear set." The second motor MG2 is an example of the "second motor." The first inverter 41 is an example of the "first inverter." The second inverter 42 is an example of the "second inverter." The battery 50 is an example of the "power storage device." The HVECU 70, the engine ECU 24, and the motor ECU 40 are examples of the "electronic control unit."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should noticed that the disclosure described in the SUMMARY has to be analyzed based on description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The disclosure is applicable to industries for manufacturing hybrid vehicles and the like.

What is claimed is:

1. A hybrid vehicle comprising:
an engine;
a first motor configured to generate a counter electromotive voltage with rotation of the first motor;
a second motor configured to input and output power to and from a drive shaft connected to an axle of the hybrid vehicle;
a planetary gear set of which three rotary elements are connected to three shafts of the first motor, the engine, and the drive shaft such that the first motor, the engine, and the drive shaft are sequentially arranged in a nomogram;
a first inverter configured to drive the first motor;
a second inverter configured to drive the second motor;
a power storage device connected to the first inverter and the second inverter via power lines; and
an electronic control unit configured to
(i) control the engine, the first inverter, and the second inverter, and
(ii) turn on the second inverter in three phases when an accelerator operation amount is equal to or greater than a predetermined operation amount during predetermined traveling in which the hybrid vehicle is traveling with the engine operated in a state in which the first inverter and the second inverter are shut down and when a rotation speed of the first motor is equal to or less than a predetermined rotation speed.

2. The hybrid vehicle according to claim 1, wherein the predetermined operation amount is a threshold value that is used to determine whether a driving force of the hybrid vehicle is requested.

3. The hybrid vehicle according to claim 1, wherein the predetermined rotation speed is a threshold value that is used to determine whether a regenerative torque based on a counter electromotive voltage is generated in the first motor.

4. The hybrid vehicle according to claim 1, wherein the electronic control unit is configured to turn on the second inverter in three phases by turning on all arm transistors of any one of upper-arm transistors and lower-arm transistors in the second inverter.

5. The hybrid vehicle according to claim 1, wherein the electronic control unit is configured to cause the hybrid vehicle to travel by the predetermined traveling by shutting down the second inverter when the second inverter is turned on in three phases based on that the accelerator operation amount is equal to or greater than the predetermined operation amount in the predetermined traveling and the rotation speed of the first motor is equal to or less than the predetermined rotation speed and when the rotation speed of the first motor becomes equal to or greater than the predetermined rotation speed.

6. A control method for a hybrid vehicle, the hybrid vehicle including:
   an engine;
   a first motor configured to generate a counter electromotive voltage with rotation of the first motor;
   a second motor configured to input and output power to and from a drive shaft connected to an axle of the hybrid vehicle;
   a planetary gear set of which three rotary elements are connected to three shafts of the first motor, the engine, and the drive shaft such that the first motor, the engine, and the drive shaft are sequentially arranged in a nomogram;
   a first inverter configured to drive the first motor; and
   a second inverter configured to drive the second motor,
   the control method comprising:
   (i) controlling the engine, the first inverter, and the second inverter; and
   (ii) turning on the second inverter in three phases when an accelerator operation amount is equal to or greater than a predetermined operation amount during predetermined traveling in which the hybrid vehicle is traveling with the engine operated in a state in which the first inverter and the second inverter are shut down and when a rotation speed of the first motor is equal to or less than a predetermined rotation speed.

* * * * *